(12) United States Patent
Mu

(10) Patent No.: US 12,407,441 B2
(45) Date of Patent: Sep. 2, 2025

(54) DOWNLINK TRANSMISSION SENDING METHOD AND APPARATUS, DOWNLINK TRANSMISSION RECEIVING METHOD AND APPARATUS, AND COMMUNICATION DEVICE

(71) Applicant: Beijing Xiaomi Mobile Software Co., Ltd., Beijing (CN)

(72) Inventor: Qin Mu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 393 days.

(21) Appl. No.: 17/911,082

(22) PCT Filed: Mar. 13, 2020

(86) PCT No.: PCT/CN2020/079323
§ 371 (c)(1),
(2) Date: Sep. 12, 2022

(87) PCT Pub. No.: WO2021/179314
PCT Pub. Date: Sep. 16, 2021

(65) Prior Publication Data
US 2023/0133415 A1 May 4, 2023

(51) Int. Cl.
*H04L 1/00* (2006.01)
*H04L 1/08* (2006.01)

(52) U.S. Cl.
CPC .......... *H04L 1/0013* (2013.01); *H04L 1/0036* (2013.01); *H04L 1/08* (2013.01)

(58) Field of Classification Search
CPC ....... H04L 1/0013; H04L 1/0036; H04L 1/08; H04L 1/0068; Y02D 30/70; H04W 72/00
See application file for complete search history.

(56) References Cited

U.S. PATENT DOCUMENTS 10,841,952 B2 * 11/2020 Bai .................. H04W 74/0816
2015/0085717 A1 * 3/2015 Papasakellariou .... H04W 72/30
370/280

(Continued)

FOREIGN PATENT DOCUMENTS

CN 110034881 A 7/2019
CN 110035510 A 7/2019

(Continued)

OTHER PUBLICATIONS

State Intellectual Property Office of the People's Republic of China, Office Action and Search Report Issued in Application No. 2020800005210, Feb. 21, 2024, 12 pages.

(Continued)

*Primary Examiner* — Afshawn M Towfighi
(74) *Attorney, Agent, or Firm* — Volpe Koenig

(57) ABSTRACT

A downlink transmission sending method is applicable to a base station. For a downlink transmission in N repetitions, in response to determining that the repetition overlaps with transmission resources of one or more synchronization signal blocks, sending the downlink transmission on first transmission resources is canceled, or the downlink transmission by puncturing the first transmission resources is sent. The first transmission resources are for the repetition and overlap with the transmission resources of the one or more synchronization signal blocks over at least one resource element (RE). N is a positive integer equal to or greater than 2.

12 Claims, 9 Drawing Sheets

(56) References Cited

U.S. PATENT DOCUMENTS

| | | | | |
|---|---|---|---|---|
| 2018/0220440 | A1* | 8/2018 | Dudda | H04W 72/23 |
| 2018/0337757 | A1* | 11/2018 | Noh | H04L 27/26 |
| 2019/0230708 | A1* | 7/2019 | Bai | H04L 5/0048 |
| 2019/0261252 | A1 | 8/2019 | Wilson et al. | |
| 2019/0281587 | A1 | 9/2019 | Zhang et al. | |
| 2019/0319748 | A1 | 10/2019 | Nam et al. | |
| 2020/0037255 | A1* | 1/2020 | Liu | H04W 52/146 |
| 2020/0053758 | A1 | 2/2020 | Hosseini et al. | |
| 2020/0112964 | A1* | 4/2020 | Yang | H04W 72/51 |
| 2022/0007412 | A1* | 1/2022 | Rico Alvarino | H04L 1/1864 |

FOREIGN PATENT DOCUMENTS

| | | |
|---|---|---|
| CN | 110166197 A | 8/2019 |
| CN | 110169178 A | 8/2019 |
| CN | 110225586 A | 9/2019 |
| CN | 110351847 A | 10/2019 |
| CN | 110495236 A | 11/2019 |
| CN | 110535583 A | 12/2019 |
| CN | 110677912 A | 1/2020 |
| CN | 110831121 A | 2/2020 |
| WO | 2019/166010 A1 | 9/2019 |
| WO | 2019/194580 A1 | 10/2019 |

OTHER PUBLICATIONS

Intel Corporation, "UE behavior on collision of downlink reception", R4-1902864, 3GPP TSG-RAN WG4 Meeting #90bis, Xi'an, China, Apr. 8-12, 2019, 6 pages.

ISA State Intellectual Property Office of the People's Republic of China, Written Opinion of the International Searching Authority Issued in Application No. PCT/CN2020/079323, Jun. 3, 2020, WIPO, 7 pages.

State Intellectual Property Office of the People's Republic of China, Office Action and Search Report Issued in Application No. 2020800005210, May 17, 2024, 12 pages.

State Intellectual Property Office of the People's Republic of China, Office Action and Search Report Issued in Application No. 2020800005210, Aug. 29, 2024, 13 pages.

Qualcomm Incorporated, "Remaining issues on control resource set and search space", 3GPP TSG RAN WG1 Meeting #93, R1-1807353, Busan, Korea, May 21-May 25, 2018, 11 pages.

ISA State Intellectual Property Office of the People's Republic of China, International Search Report Issued in Application No. PCT/CN2020/079323, Jun. 3, 2020, WIPO, 4 pages.

* cited by examiner

DOWNLINK TRANSMISSION SENDING METHOD AND APPARATUS, DOWNLINK TRANSMISSION RECEIVING METHOD AND APPARATUS, AND COMMUNICATION DEVICE

CROSS-REFERENCE TO RELATED APPLICATION

This application is the U.S. national phase application of International Application No. PCT/CN2020/079323, filed on Mar. 13, 2020, the disclosure of which is incorporated herein by reference in its entirety for all purposes.

TECHNICAL FIELD

The present disclosure relates to, but is not limited to, the field of wireless communication technology, and in particular, relates to a downlink transmission sending method and apparatus, a downlink transmission receiving method and apparatus, and a communication device.

BACKGROUND

In a 4th Generation (4G) LTE (Long Term Evolution) mobile communication system, two kinds of technologies, Machine Type Communication (MTC) and Narrow Band Internet of Things (NB-IoT), are proposed to support Internet of Things (IoT) services. These two kinds of technologies are aimed primarily at a scenario with features of low-speed or high-latency, etc., such as a meter reading scenario and an environmental monitoring scenario. At present, the maximum rate supported by the NB-IoT is only several hundred kb/s and the maximum rate supported by the MTC is only several Mb/s.

However, as the IoT services develop, for example, as the services, such as video monitoring, smart home, wearable devices, and industrial sensing and monitoring, are popularized, these services usually expect not only a speed of tens to one hundred Mb/s, but also a relatively high requirement on latency. Therefore, the MTC and NB-IoT technologies in LTE are difficult to meet these requirements. Based on the above status, many companies have proposed to design a new IoT technology in 5th Generation (5G) New Radio (NR) to cover the requirements of such kind of IoT devices of midrange.

Similar to the IoT devices in LTE, the IoT based on the 5G NR usually expect to meet the following requirements: a low cost, a low complexity, a coverage enhancement to a certain extent and a power saving.

However, the current design of the existing NR is for high-level terminals with features such as high-speed and low-latency and thus cannot meet the above-mentioned requirements of the NR-IoT. Therefore, the existing NR system is expected to be modified to meet the requirements of the NR-IoT. For example, in order to meet the requirements such as the low cost and the low complexity, a radio frequency (RF) bandwidth of the NR-IoT may be limited, e.g., to 5 MHz or 10 MHz, or a size of an NR-IoT buffer may be limited so as to limit a size of a transmission block received every time. For saving power, possible optimization directions are to simplify a communication process, reduce a number of times at which an NR-IoT user detects a downlink control channel, etc.

In an NR scenario with the coverage enhancement, a coverage enhancement solution is expected for an NR-lite user device since its terminal capabilities, such as its bandwidth and its receiving antennas number, are limited and thus its terminal coverage is badly affected.

In order to achieve the coverage enhancement, a general coverage enhancement scheme is to transmit repetitions. For example, one piece of information is repeatedly sent in time domain, and then received and combined at a terminal.

In the NR, a synchronization signal block (SSB) is sent to enable the terminal to find a cell when being turned on for access and to find a new cell when moving in a system.

SUMMARY

In view of the above, embodiments of the present disclosure provide a downlink transmission sending method and apparatus, a downlink transmission receiving method and apparatus, and a communication device.

In a first aspect of the embodiments of the present disclosure, a downlink transmission sending method is provided. The method is applicable to a base station and includes: for a downlink transmission in N repetitions, in response to determining that a repetition overlaps with second transmission resources of one or more synchronization signal blocks, canceling sending the downlink transmission on first transmission resources, or sending the downlink transmission by puncturing the first transmission resources; where the first transmission resources are for the repetition and overlap with the second transmission resources of the one or more synchronization signal blocks over at least one resource element (RE); where sending the downlink transmission by puncturing the first transmission resources includes canceling sending a part of the downlink transmission which is mapped onto one or more overlapped resources between the first transmission resources and the second transmission resources; and where N is a positive integer equal to or greater than 2.

In a second aspect of the embodiments of the present disclosure, a downlink transmission receiving method. The method is applicable to a terminal and includes: for a downlink transmission in N repetitions, in response to determining that a repetition overlaps with second transmission resources of one or more synchronization signal blocks, canceling receiving the downlink transmission on first transmission resources, or receiving the downlink transmission by puncturing the first transmission resources; where the first transmission resources are for the repetition and overlap with the second transmission resources of the one or more synchronization signal blocks over at least one resource element (RE); where receiving the downlink transmission by puncturing the first transmission resources includes canceling receiving a part of the downlink transmission which is mapped onto one or more overlapped resources between the first transmission resources and the second transmission resources; and where N is a positive integer equal to or greater than 2.

In a third aspect of the embodiments of the present disclosure, a communication device is provided and includes one or more processors, a transceiver, a memory, and an executable program stored on the memory and capable of being run by the one or more processors, where the one or more processors, when executing the executable program, perform the method provided by any technical solution of the aforementioned first aspect.

It should be understood that the above general description and the following detailed description are only illustrative and explanatory, and are not intended to limit the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

DETAILED DESCRIPTION OF THE EMBODIMENTS

Figure 1:
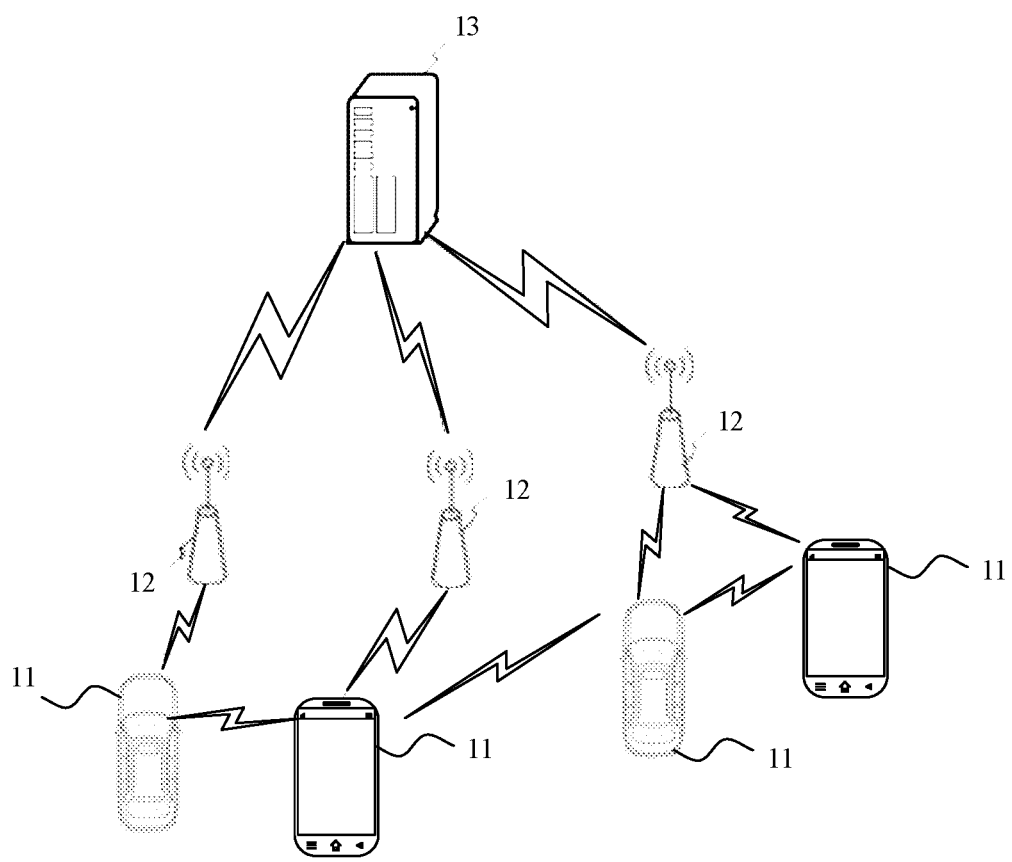
FIG. 1 illustrates a schematic structural diagram of a wireless communication system according to an example.

Embodiments will be described in detail here with the examples thereof illustrated in the drawings. Where the following descriptions involve the drawings, like numerals in different drawings refer to like or similar elements unless otherwise indicated. The implementations described in the following examples do not represent all implementations consistent with the present disclosure. Rather, they are merely examples of apparatuses and methods consistent with some aspects of the present disclosure as detailed in the appended claims.

The terms used in the present disclosure are for the purpose of describing particular examples only, and are not intended to limit the present disclosure. Terms determined by "a" and "the" in their singular forms in the present disclosure are another example and the appended claims are also intended to include plurality, unless clearly indicated otherwise in the context. It should also be understood that the term "and/or" as used herein is and includes any and all possible combinations of one or more of the associated listed items.

It is to be understood that, although terms "first," "second," "third," and the like another example may be used in the present disclosure to describe various information, such information should not be limited to these terms. These terms are only used to distinguish information of the same category with each other. For example, without departing from the scope of the present disclosure, first information may be referred as second information; and similarly, second information may also be referred as first information. Depending on the context, the word "if" as used herein may be interpreted as "when", "upon", or "in response to determining".

FIG. 1, illustrates a schematic structural diagram of a wireless communication system provided by an example of the present disclosure. As illustrated in FIG. 1, the wireless communication system is a communication system based on cellular mobile communication technologies, and may include several terminals 11 and several base stations 12.

The terminal 11 may refer to a device that provides voice and/or data connectivity for a user. The terminal 11 may communicate with one or more core networks via a radio access network (RAN). The terminal 11 may be an Internet of Things terminal, such as a sensor device, a mobile phone (or called a "cellular" phone), and a computer equipped with the Internet of Things terminal, which may be a fixed, portable, pocket-sized, handheld, computer-built-in or vehicle-mounted device as an instance. For example, the terminal 11 may be a station (STA), a subscriber unit, a subscriber station, a mobile station, a mobile, a remote station, an access point, a remote terminal, an access terminal, a user terminal, a user agent, a user device, or a user equipment (UE). The terminal 11 may also be a device like an unmanned drone. Further, the terminal 11 may also be a vehicle-mounted device, for example, it may be an on-board computer with a wireless communication function, or a wireless communication device connected to the on-board computer. Additionally, the terminal 11 may also be a roadside device, for example, it may be a street lamp, signal lamp or another roadside device with a wireless communication function.

The base station 12 may be a network side device in the wireless communication system. The wireless communication system may be a $4^{th}$ generation mobile communication (4G) system, which is also known as a Long Term Evolution (LTE) system. The wireless communication system may also be a 5G system, which is also known as a New Radio (NR) system or a 5G NR system. Alternatively, the wireless communication system may also be a next-generation system of the 5G system. The access network in the 5G system can be called a New Generation-Radio Access Network (NG-RAN) or an MTC system.

The base station 12 may be an evolved Node-B (eNB) adopted in the 4G system. Alternatively, the base station 12 may also be a next generation Node-B (gNB) adopting a centralized and distributed architecture in the 5G system. When adopting the centralized and distributed architecture, the base station 12 usually includes a central unit (CU) and at least two distributed units (DU). The central unit is provided with protocol stacks of a packet data convergence protocol (PDCP) layer, a radio link control protocol (RLC) layer, and a media access control (MAC) layer. The distributed unit is provided with protocol stacks of a physical (PHY) layer. The examples of the present disclosure do not limit the specific implementation of the base station 12.

A wireless connection may be established between the base station 12 and the terminal 11 through a wireless air interface. In different implementations, the wireless air interface is a wireless air interface based on the fourth-generation mobile communication network technology (4G) standards; or, the wireless air interface is a wireless air interface based on the fifth-generation mobile communication network technology (5G) standards, such as the wireless air interface is a new radio; or, the wireless air interface may also be a wireless air interface based on next-generation mobile communication network technology standards of 5G.

In some examples, an end-to-end connection may also be established between the terminals 11, for example, in a scenario of a vehicle-to-everything (V2X) communication such as a vehicle-to-vehicle (V2V) communication, a vehicle-to-infrastructure (V2I) communication and a vehicle-to-pedestrian (V2P) communication.

In some examples, the above-mentioned wireless communication system may further include a network management device 13.

The several base stations 12 are connected to the network management device 13 respectively. The network management device 13 may be a core network device in the wireless communication system. For example, the network management device 13 may be a mobility management entity (MME) in an evolved packet core (EPC) network. Alternatively, the network management device may be another core network device, such as a serving gate way (SGW), a public data network gate way (PGW), a policy and charging rules function unit (PCRF) or a home subscriber server (HSS). The implemented forms of the network management device 13 are not limited by the examples of the present disclosure.

Figure 2:
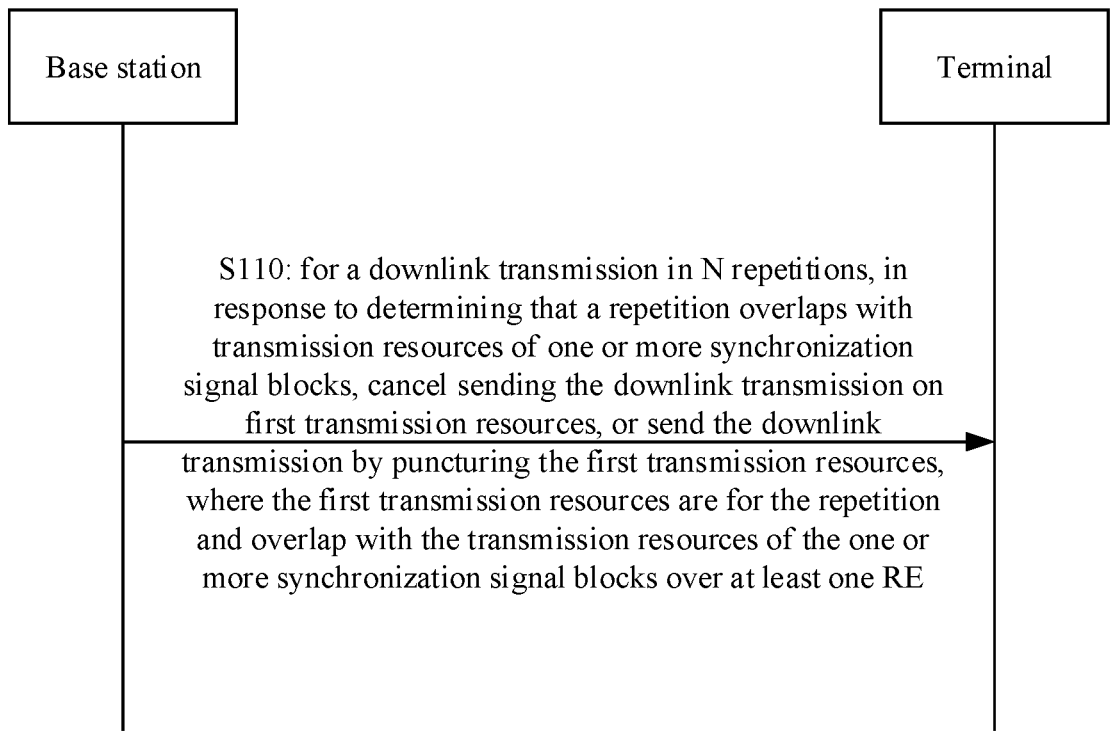
FIG. 2 illustrates a schematic flowchart of a downlink transmission sending method according to an example.

As illustrated in FIG. 2, is an example of the present disclosure that provides a downlink transmission sending method. The method is applicable to a base station and includes the following step.

S110: for a downlink transmission in N repetitions, in response to determining that a repetition overlaps with transmission resources of one or more synchronization signal blocks, it is canceled to send the downlink transmission on first transmission resources, or the downlink transmission is sent by puncturing the first transmission resources. The first transmission resources are for the repetition and overlap with the transmission resources of the one or more synchronization signal blocks over at least one resource element (RE). N is a positive integer equal to or greater than 2.

The downlink transmission sending method in this example may be applied to 4G, 5G or any subsequent generation communication system. Taking a 5G system as an example, every NR cell periodically send one or more synchronization signals in a downlink direction. A primary synchronization signal, a secondary synchronization signal and a physical broadcast channel, which are called the synchronization signal, are carried by a synchronization signal block (SSB). One specific SSB occupies 4 Orthogonal Frequency Division Multiplexing (OFDM) symbols in time domain and 240 subcarriers in frequency domain.

A key difference between the SSB and an LTE signal is that a network (for example, a base station) may transmit the SSB in a beam scanning manner, that is, transmit different SSBs on different beams in a form of time division multiplexing. The SSB set in the beam scanning manner is called a synchronization signal burst set (SSB burst). For a specific terminal, only one SSB can be seen by it and the other SSBs are informed to it through high-level signaling.

In some scenarios, the transmission resources of the one or more SSBs overlap with the resources of a downlink transmission. The downlink transmission may include a downlink control channel transmission and/or a downlink data channel transmission. For example, the downlink transmission includes a physical downlink control channel (PDCCH) transmission and/or a physical downlink shared channel (PDSCH) transmission.

The downlink transmission for an MTC terminal, an NB-IoT terminals or an NR-lite terminal may be transmitted repeatedly for multiple times. The typical NR-lite terminal includes, but is not limited to, a wearable device, an industrial sensor, a monitoring device, and/or a medical device.

For example, one piece of data is transmitted in N repetitions. Thus, the transmission resources occupied by one or more repetitions of the N repetitions may overlap with the transmission resources of the one or more SSBs. The resource overlap here means that there are the transmission resources occupied by both the one or more repetitions and the one or more SSBs.

In the example of the present disclosure, when finding that the transmission resources of the one or more repetitions overlap with the transmission resources of the one or more SSBs over at least one RE, cancel sending the downlink transmission on the first transmission resources which has an overlap over the at least RE, or perform the transmission by puncturing the first transmission resources.

To cancel sending the downlink transmission on the first transmission resources, means that on the transmission resources that overlap with the one or more SSBs over the at least one RE, no data transmission is performed but only the synchronization signal is transmitted.

To be sent in a puncturing way means that it is to cancel sending a part of the downlink transmission which is mapped onto one or more overlapped resources between the first transmission resources and the second resources. In particular, to be sent in the puncturing way includes puncturing the part of the first transmission resources that is occupied by the one or more SSBs, that is, discarding the data information mapped to the part occupied by the one or more SSBs. Meanwhile, the part of the first transmission resources that is not occupied by the one or more SSBs is still used for sending the downlink transmission.

According to the examples of the present disclosure, when one or more repetitions of the N repetitions are separately in resource conflict with the synchronization signal transmission, cancel sending the downlink transmission corresponding to the one or more repetitions or to send the downlink transmission in the puncturing way. In this way, it is solved how the base station handles the conflict between wireless signals when there are multiple repetitions of the downlink transmission and the transmission resources of the one or more SSBs overlap with the transmission resources of at least one repetition. Thereby, achieving a conflict-free and effective transmission between the synchronization signals and the wireless signals in such scenarios where the multiple repetitions occur.

In some examples, the method further includes: determining, in response to determining that an overlapped status between the first transmission resources and the second transmission resources of the one or more SSBs does not meet a preset condition, to cancel sending the downlink transmission on the first transmission resources; and/or determining, in response to determining that the overlapped status between the first transmission resources and the second transmission resources of the one or more SSBs meets the preset condition, to send the downlink transmission by puncturing the first transmission resources.

In the examples of the present disclosure, it is based on the overlapped status between the first transmission resources corresponding to the one or more repetitions and the second transmission resources of the one or more SSBs to determine whether the base station cancels the sending on the first transmission or perform the sending in the puncturing way.

For example, in a case where there is only a little overlap between the first transmission resources and the second transmission resources of the one or more SSBs, it may lead to more transmission resource waste when the sending on the whole first transmission resources is canceled, and thus it is inclined to select the sending in the puncturing way, thereby reducing the resource waste.

As another example, in a case where there is a great overlap between the first transmission resources and the second transmission resources of the one or more SSBs, the data amount of the downlink transmission is very small to be sent through being sent in the puncturing way, as well as both the transmission complexity of the base station and the complexity of the terminal go up, and thus it is inclined to select the whole first transmission resources for sending the one or more SSBs, thereby lowering the data transmission complexity of both the base station and the terminal.

For example, the overlapped status between the first transmission resources and the second transmission resources of the one or more SSBs may meet a preset condition in at least one case of: a number of REs of the one or more overlapped resources between the first transmission resources and the second transmission resources being less than a first threshold; or a proportion of the one or more overlapped resources between the first transmission resources and the second transmission resources in the first transmission resources being less than a second threshold.

In the example of the present disclosure, the overlapped resources between the first transmission resources and the second transmission resources are counted in a unit of RE. When the number of the overlapped REs is less than the first threshold, it may be regarded as a little overlap degree, and thus, it is preferred to perform the sending in the puncturing way to reduce the resource waste. The first threshold value is a positive integer, which may be taken from an experimental value or an empirical value.

In some other examples, however, when the first transmission resources and the second transmission resources have a relatively small size or a relatively large size on their own, it may lead to the unnecessary resource waste and/or an encoding and decoding complexity if the overlap degree is still determined based on the comparison between the number of the overlapped REs and the first threshold. Thus, it may be determined based on the proportion of the number of the overlapped resources in the first transmission resources. The second threshold may be a ratio, for example, the percentage. The specific value of the second threshold may be 0.2, 0.3, 0.4, or 0.5, etc.

Therefore, in one or more examples of the present disclosure, based on the overlapped status, it may select a scheme that the sending is canceled or a scheme that the sending is performed in the puncturing way so as to be suited to the current overlapped status, thereby avoiding the unnecessary resource waste as much as possible and inhibiting increase of the unnecessary encoding and decoding complexity.

In some examples, when it is to cancel sending the downlink transmission on the first transmission resources, the method further includes: discarding M repetitions corresponding to the first transmission resources, so that the downlink transmission includes a total of N–M repetitions; or delaying sending the M repetitions corresponding to the first transmission resources, so that the downlink transmission includes a total of N repetitions.

M is a positive integer less than N.

As a result of canceling the sending on the first transmission resources, the number of the repetitions from the base station on original configured resources may be less than the configured number of times, N. For example, through canceling the sending on the first transmission resources, the transmission times of the repetitions actually completed is N–M.

In the examples of the present disclosure, there are two approaches to deal with this situation.

One approach is to discard the M repetitions and maintain the N–M repetitions.

The other approach is to delay the transmission of the M repetitions canceled on the first transmission resources to ensure the transmission for N times. For example, the uncompleted M repetitions are immediately transmitted after the N–M transmissions are completed. As another example, they are delayed to be transmitted in a next transmission period. When the transmission is periodic, the M repetitions canceled in this period are to be automatically delayed and transmitted on the transmission resources configured in the next period. The delay of the transmission is a concept in comparison with the original planned transmission moment of the canceled M repetitions.

In an example, which transmission approach, discarding the M repetitions or delaying the M repetitions, may be determined based on a current channel condition. For example, in a case where the current channel condition is good, e.g., in a case where one or more reference signals of various types are transmitted and then it is found that the received strength(s) of the one or more reference signals are greater than or equal to a strength threshold, the current channel condition may be considered to be good, and the M repetitions may be discarded directly, instead of being delayed. If it is found that the current channel condition is bad, for example, the received strength(s) of the one or more reference signals are less than the aforementioned strength threshold, the M repetitions may be delayed.

In this way, a receiving gain at the terminal can still be ensured when the channel condition is good even if one or more repetitions are appropriately canceled, and the receiving gain at the terminal can also be ensured when the channel condition is bad through delaying the M repetitions.

In another example, which transmission approach, discarding the M repetitions or delaying the M repetitions, may be determined based on the value of M. For example, when M is greater than or equal to a discarding threshold, without performing the transmission delay, the terminal may not obtain an enough time-domain gain to successfully decode the data sent by the base station. Therefore, the transmission delay approach is adopted so that the final actual number of the repetitions is still N. If the current M is less than the discarding threshold, the number of the repetitions actually received by the terminal, without performing the transmission delay, is still relatively large, and the time-domain gain is enough to successfully decode the data sent by the base station.

In some examples, the discarding threshold may be determined based on N. The discarding threshold may be a preset percentage of N.

In some other examples, the value of M and the channel condition may be combined to jointly determine which approach is adopted, discarding M repetitions so that the number of the actual repetitions is N–M or delaying M repetitions so that the number of the actual repetitions is N.

In one or more examples of the present disclosure, the sending in the puncturing way includes sending the downlink transmission on the first transmission resources other than the overlapped resources. Through the sending in the puncturing way, it can reduce the transmission resource waste as much as possible.

Figure 3:
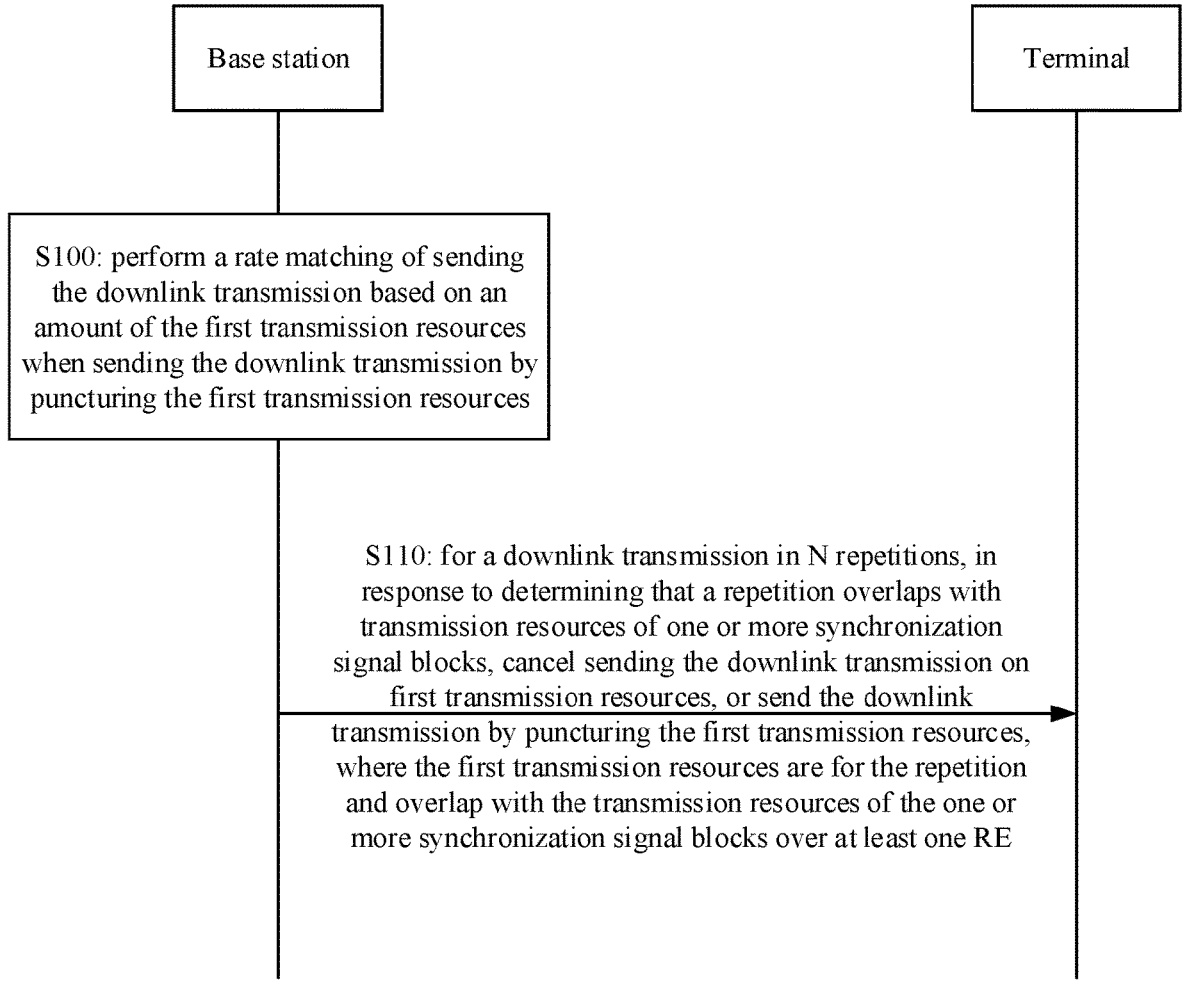
FIG. 3 illustrates a schematic flowchart of a downlink transmission sending method according to an example.

In some examples, as illustrated in FIG. 3, the method further includes the following step.

S100: it is to perform a rate matching of sending the downlink transmission based on an amount of the first transmission resources when sending the downlink transmission by puncturing the first transmission resources. The transmission in the puncturing way includes a sending in the puncturing way and a receiving in the puncturing way. For the downlink transmission, the transmission in the puncturing way includes the sending in the puncturing way at the base station side and the receiving in the puncturing way at the terminal side.

In particular, to perform the rate matching of sending the downlink transmission based on the amount of the first transmission resources, means that when the rate matching is performed, the resources participated in the rate matching include the part that overlaps with the transmission resources of the one or more SSBs.

When the base station adopts the scheme of sending in the puncturing way to transmit the repetition overlapped with the resources of the one or more SSBs, the rate matching of the downlink transmission is still performed based on the amount of the first transmission resources before being punctured, so as to lower the complexity of the rate matching. Thus, it avoids both high encoding and modulating complexity at the base station and high decoding and demodulating complexity at the terminal which are caused by different types of rate matching for the multiple repetitions of the same data.

In some examples, the downlink transmission includes a physical downlink shared channel (PDSCH) transmission and/or a physical downlink control channel (PDCCH) transmission.

For example, for the PDSCH, the base station may not send a repetition of the PDSCH, but give priority to transmitting the one or more SSBs on its resource.

For the PDCCH, when a certain resource position candidate has been selected by the base station to carry the information of the PDCCH but on the resource position candidate the transmission resource of a certain repetition of the PDCCH overlaps with the transmission resources of the one or more SSBs, the base station may give priority to transmitting the one or more SSBs, instead of transmit the repetition on the position where there is a collision (i.e., there is the overlap between the resources).

Of course, during a specific implementation, it is not limited to the examples of the downlink transmission in the above description.

Figure 4:
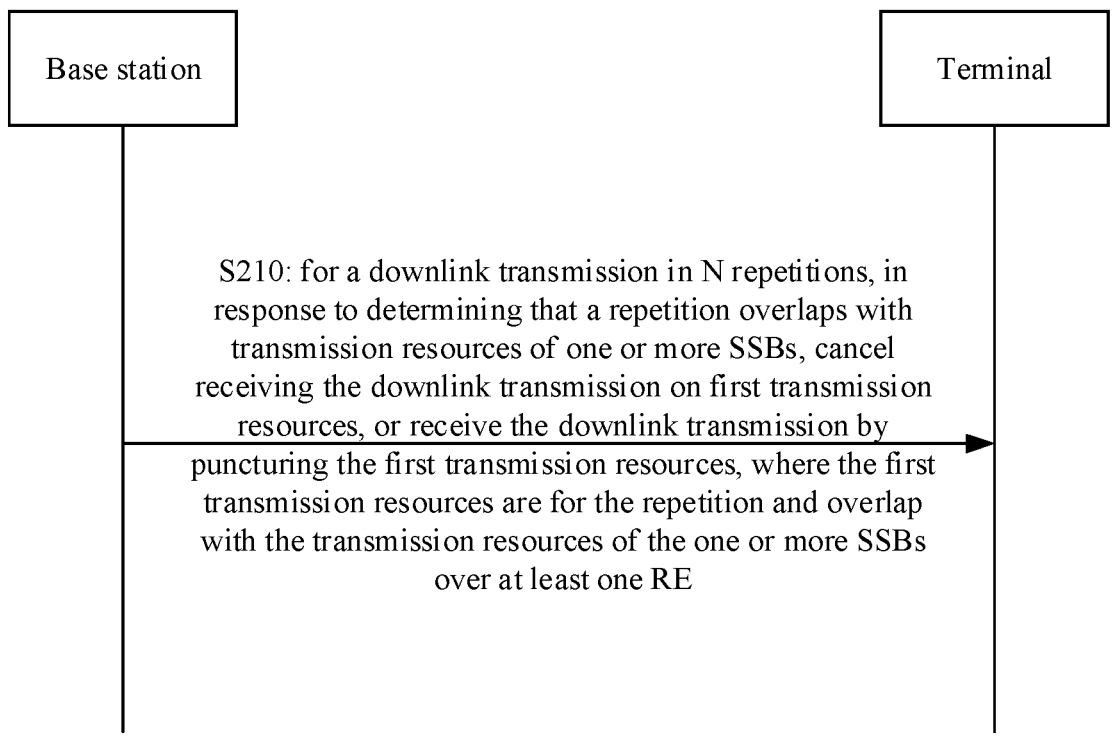
FIG. 4 illustrates a schematic flowchart of a downlink transmission receiving method according to an example.

As illustrated in FIG. 4, this example provides a downlink transmission receiving method, which is applicable to a terminal and includes the following step.

S210: for a downlink transmission in N repetitions, in response to determining that a repetition overlaps with transmission resources of one or more SSBs, it is canceled to receive the downlink transmission on first transmission resources, or the downlink transmission is received by puncturing the first transmission resources. The first transmission resources are for the repetition and overlap with the transmission resources of the one or more SSBs over at least one RE. N is a positive integer equal to or greater than 2. The receiving in the puncturing way may include canceling receiving a part of the downlink transmission which is mapped onto one or more overlapped resources between the first transmission resources and the second resources.

The terminal described in the examples of the present disclosure may be a terminal of various types, for example, an MTC terminal, an NB-IoT terminal or an NR-lite terminal.

Since both the resource scheduling for the downlink transmission and the resource scheduling for the one or more SSBs are completed in advance, the terminal may, on its own, determine whether there is the resource overlap based on the resource scheduling from the base station before starting to receive the downlink transmission.

Therefore, for the downlink transmission in N repetitions in the examples of the present disclosure, in a case where the transmission resources of the one or more repetitions overlap with the transmission resources of the one or more SSBs over at least one RE, the terminal is also to cancel receiving the downlink transmission on the first transmission resources or to receive the downlink transmission in the puncturing way. To receive in the puncturing way includes puncturing the part of the first transmission resources that is occupied by the one or more SSBs, that is, discarding data information mapped to the part occupied by the one or more SSBs. Meanwhile, the part of the first transmission resources that is not occupied by the one or more SSBs is still used for receiving the downlink transmission.

By canceling the receiving or by receiving in the puncturing way, the terminal can reduce unnecessary receptions of the downlink transmission and reduce the power consumption caused by the unnecessary downlink receptions of this type, and thereby extend its battery life.

In some examples, the method further includes: determining, in response to determining that an overlapped status between the first transmission resources and the second transmission resources of the one or more SSBs does not meet a preset condition, to cancel receiving the downlink transmission on first transmission resources; and/or determining, in response to determining that the overlapped status between the first transmission resources and the second transmission resources of the one or more SSBs meets the preset condition, to receive the downlink transmission by puncturing the first transmission resources.

In one or more examples of the present disclosure, the terminal may also determine whether the preset condition is met based on the overlap status. When the preset condition is met, the scheme of the receiving in the puncturing way is adopted to reduce the resource waste caused by directly canceling the transmission. When the preset condition is not met, the scheme of canceling the receiving is adopted to reduce the unnecessary receptions.

In some examples, the overlapped status between the first transmission resources and the second transmission resources of the one or more SSBs may meet a preset condition in at least one case of: a number of REs of the one or more overlapped resources between the first transmission resources and the second transmission resources being less than a first threshold; or a proportion of the one or more overlapped resources between the first transmission resources and the second transmission resources in the first transmission resources being less than a second threshold.

In the examples of the present disclosure, the overlapped status between the first transmission resources and the second transmission resources is estimated in a unit of RE. The larger the number of the overlapped REs, the more serious the overlapped status.

Specifically, how the preset condition is met may be determined by counting the overlapped REs and then comparing the number of overlapped REs with the first threshold. Of course, it may also be estimated by utilizing the proportion, so as to indicate the overlapped degree between the first transmission resources and the second transmission resources of the one or more SSBs more accurately.

Figure 5:
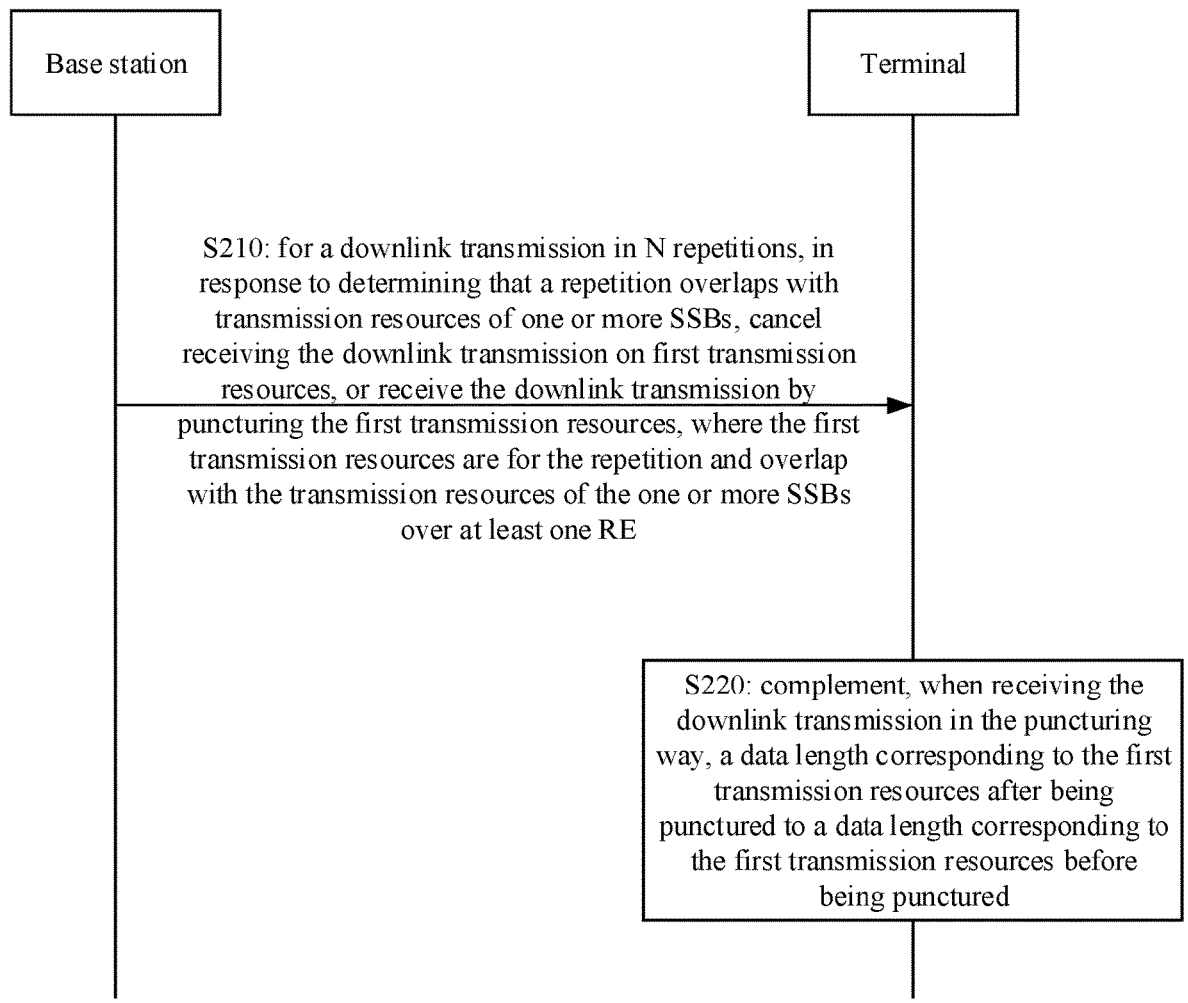
FIG. 5 illustrates a schematic flowchart of another downlink transmission receiving method according to an example.

In some examples, as illustrated in FIG. 5, the method further includes the following step.

5220: it is to complement, when decoding the downlink transmission received in the puncturing way, a data length corresponding to the first transmission resources after being punctured to a data length corresponding to the first transmission resources before being punctured.

If the terminal adopts the scheme of the receiving in the puncturing way, the terminal still receives the N repetitions with the one or more repetitions being punctured, and thus the data length of a repetition received in the puncturing way is smaller than an expected data length. In order to achieve decoding multiple repetitions jointly, the data length of the first transmission resources punctured is to be complemented, so that the data length after being complemented is consistent with the expected original data length of the first transmission resources. Therefore, after being aligned with multiple other repetitions without being punctured, the decoding can be performed to ensure the correct decoding at the terminal.

In some examples, complementing, in response to decoding the downlink transmission received in the puncturing way, the data length corresponding to the first transmission resources after being punctured to the data length corresponding to the first transmission resources before being punctured includes: setting a power for receiving punctured transmission resources of the first transmission resources to a preset value in response to decoding the downlink transmission received in the puncturing way; or taking a preset sequence as data symbols carried by the punctured transmission resources of the first transmission resources in response to decoding the downlink transmission received in the puncturing way; or taking a predetermined value as data bits carried by the punctured transmission resources of the first transmission resources in response to decoding the downlink transmission received in the puncturing way.

In particular, there are two selectable manners for complementing the data length. One manner is to set the receiving power of the punctured transmission resources to the preset value directly before decoding the downlink data received in the puncturing way. The preset value may be 0 or any positive number. In this way, the data length is complemented in a power level.

The other way is to take the preset sequence as the data symbols or the data bits of the punctured transmission resources when decoding the downlink transmission received in the puncturing way.

The preset sequence may be a sequence all filled with "0", or a sequence all filled with "1", or a sequence filled with "0" and "1" alternatively. The terminal may restore the data sent by the base station through various error correction mechanisms and the like.

In some examples, when taking the preset sequence to complement the data symbols, the mixed sequence formed by the combination of "0" and "1" may be given priority. Generally, most data are transmitted with "0" and "1". Therefore, it can reduce an error correction workload in the decoding process.

In the examples of the present disclosure, one data symbol corresponds to multiple data bits. For example, multiple data bits are modulated to form one data symbol. When the data length of the punctured first transmission resources is complemented, the data length may be complemented with taking the data symbol as the smallest unit or taking the data bit as the smallest unit.

In one example, the predetermined value may be "0" or "1".

In another example, the predetermined value may include both "0" and "1" at the same time. During complementing the data length, it is to perform the complementing by selecting "0" or "1" according to a complementing strategy. For example, "0" and "1" are alternately taken according to the complementing strategy to complement the data length, so as to reduce the error correction workload in the decoding process as much as possible.

In the examples of the present disclosure, taking the preset sequence to complement the data symbols means that the terminal complements the length after receiving and converting the data into the data symbols according to the receiving power and before performing the demodulation.

In the examples of the present disclosure, taking the predetermined value to complement the data bits means that the terminal complements the data length after completing the demodulation.

In short, there are many ways to complement the data in various stages that the terminal decodes the data.

In some examples, when it is to cancel receiving the downlink transmission on the first transmission resources, the method further includes: performing a data decoding based on N–M repetitions, where M is a number of the repetitions that overlap with the transmission resources of the one or more SSBs, and M is a positive integer less than N.

When the M repetitions overlapped with the transmission resources of the one or more SSBs are directly discarded, the terminal may perform the decoding according to the N–M repetitions actually transmitted. For example, the terminal may combine the N–M repetitions to decode the data.

In some other examples, when it is to cancel receiving the downlink transmission on the first transmission resources, the method further includes: delaying receiving M repetitions corresponding to the first transmission resources; and performing a data decoding based on the N repetitions.

When it is to cancel receiving the M repetitions on the first transmission resources, but the base station is to delay these M repetitions, the terminal delays receiving the M repetitions, and finally, the actual number of the repetitions received by the terminal is still N. Therefore, it still decodes the data based on these N repetitions.

In order to ensure the reception N times, the reception of the M repetitions canceled on the first transmission resources is to be delayed. For example, after the transmission of N–M repetitions is completed, it is to immediately receive the uncompleted M repetitions. As another example, they are delayed to be transmitted in a next transmission period. When the transmission is periodic, the M repetitions canceled in this period are to be automatically delayed and received on the transmission resources configured in the next period. The delay of the transmission is a concept in comparison with the original planned moment of the canceled M repetitions.

In particular, referring to the examples applicable to the base station, the terminal may determine to discard the M repetitions or to delay the M repetitions based on a channel condition and/or the value of M.

Figure 6:
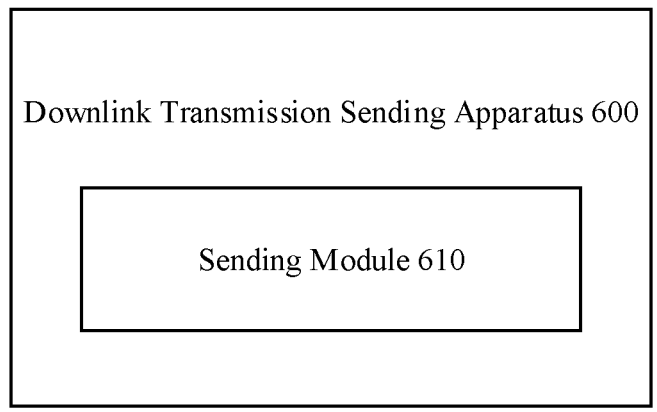
FIG. 6 illustrates a schematic structural diagram of a downlink transmission sending apparatus according to an example.

As illustrated in FIG. 6, this example provides a downlink transmission sending apparatus 600, which is applicable to a base station and includes a sending module 610. The sending module 610 is configured to a downlink transmission in N repetitions, in response to determining that a repetition overlaps with transmission resources of one or more SSBs, cancel sending the downlink transmission on first transmission resources, or send the downlink transmission by puncturing the first transmission resources. The first transmission resources are for the repetition and overlap with the transmission resources of the one or more SSBs over at least one RE. N is a positive integer equal to or greater than 2. The sending in a puncturing way may include canceling sending a part of the downlink transmission which is mapped onto one or more overlapped resources between the first transmission resources and the second resources.

In some examples, the sending module 610 may be a program module. After being executed by one or more processors, the program module may cancel sending the downlink transmission in the N repetitions on the first transmission resources or send the downlink transmission by puncturing the first transmission resources in response to determining that a repetition overlaps with the transmission resources of the one or more SSBs. The first transmission resources are for the repetition and overlap with the transmission resources of the one or more SSBs over at least one RE.

In some other examples, the sending module 610 may be a module integrating software and hardware. The module integrating software and hardware includes, but is not limited to, various programmable arrays. The programmable array includes, but is not limited to, a complex programmable array or a field programmable array.

In some other examples, the sending module 610 may include a complete hardware module. The complete hardware module includes, but is not limited to, an application specific integrated circuit.

In some examples, the apparatus 600 further includes a first determining module.

The first determining module is configured to: determine, in response to determining that the overlapped status between the first transmission resources and the second transmission resources of the one or more SSBs does not meet a preset condition, to cancel sending the downlink transmission on the first transmission resources; and/or, determine, in response to determining that the overlapped status between the first transmission resources and the second transmission resources of the one or more SSBs meets the preset condition, to send the downlink transmission by puncturing the first transmission resources.

In some examples, the overlapped status between the first transmission resources and the second transmission resources of the one or more SSBs may meet a preset condition in at least one case of: a number of REs of the one or more overlapped resources between the first transmission resources and the second transmission resources being less than a first threshold; or a proportion of the one or more overlapped resources between the first transmission resources and the second transmission resources in the first transmission resources being less than a second threshold.

In some examples, when it is to cancel sending the downlink transmission on the first transmission resources, the apparatus 600 further includes: a discarding module, configured to discard M repetitions corresponding to the first transmission resources, so that the downlink transmission includes a total of N–M repetitions; or a first delaying module, configured to delay sending the M repetitions corresponding to the first transmission resources, so that the downlink transmission includes a total of N repetitions.

M is a positive integer less than N.

In some examples, the apparatus 600 further includes: a rate matching module, configured to perform, based on an amount of the first transmission resources, a rate matching of sending the downlink transmission in response to sending the downlink transmission by puncturing the first transmission resources.

In some examples, the downlink transmission includes a physical downlink shared channel (PDSCH) transmission and/or a physical downlink control channel (PDCCH) transmission.

Figure 7:
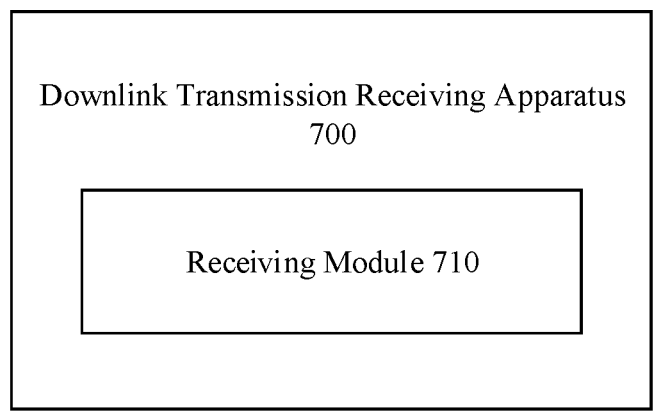
FIG. 7 illustrates a schematic structural diagram of a downlink transmission receiving apparatus according to an example.

As illustrated in FIG. 7, the example of the present disclosure provides a downlink transmission receiving apparatus 700, applicable to a terminal and includes: a receiving module 710 that is configured to a downlink transmission in N repetitions, in response to determining that a repetition overlaps with transmission resources of one or more SSBs, cancel receiving the downlink transmission on first transmission resources, or receive the downlink transmission by puncturing the first transmission resources. The first transmission resources are for the repetition and overlap with the transmission resources of the one or more SSBs over at least one RE. N is a positive integer equal to or greater than 2. The receiving in the puncturing way may include canceling receiving a part of the downlink transmission which is mapped onto one or more overlapped resources between the first transmission resources and the second resources.

In some examples, the receiving module 710 may be a program module. After being executed by one or more processors, the program module may cancel receiving the downlink transmission in the N repetitions on the first transmission resources or receive the downlink transmission by puncturing the first transmission resources in response to determining that the repetition overlaps with the transmission resources of the one or more SSBs. The first transmission resources are for the repetition and overlap with the transmission resources of the one or more SSBs over at least one RE.

In some other examples, the receiving module 710 may be a module integrating software and hardware. The module integrating software and hardware includes, but is not limited to, various programmable arrays. The programmable array includes, but is not limited to, a complex programmable array or a field programmable array.

In some other examples, the receiving module 710 may include a complete hardware module. The complete hardware module includes, but is not limited to, an application specific integrated circuit.

Based on the above solutions, the apparatus 700 further includes a second determining module. The second determining module is configured to: determine, in response to determining that the overlapped status between the first transmission resources and the second transmission resources of the one or more SSBs does not meet a preset condition, to cancel receiving the downlink transmission on first transmission resources; and/or, determine, in response to determining that the overlapped status between the first transmission resources and the second transmission resources of the one or more SSBs meets the preset condition, to receive the downlink transmission by puncturing the first transmission resources.

In some examples, the overlapped status between the first transmission resources and the second transmission resources of the one or more SSBs may meet a preset condition in at least one case of: a number of REs of the one or more overlapped resources between the first transmission resources and the second transmission resources being less than a first threshold; or a proportion of the one or more overlapped resources between the first transmission resources and the second transmission resources in the first transmission resources being less than a second threshold.

In some examples, the apparatus 700 further includes: a complementing module, configured to complement, in response to decoding the downlink transmission received in the puncturing way, a data length corresponding to the first transmission resources after being punctured to a data length corresponding to the first transmission resources before being punctured.

In some examples, the complementing module is configured to: set a power for receiving punctured transmission resources of the first transmission resources to a preset value when decoding the downlink transmission received in the puncturing way; or, take a preset sequence as data symbols carried by the punctured transmission resources of the first transmission resources when decoding the downlink transmission received in the puncturing way; or, take a predetermined value as data bits carried by the punctured transmission resources of the first transmission resources when decoding the downlink transmission received in the puncturing way.

In some examples, when it is to cancel receiving the downlink transmission on the first transmission resources, the apparatus 700 further includes: a first decoding module, configured to perform a data decoding based on N–M repetitions, where M is a number of the repetitions that overlap with the transmission resources of the one or more SSBs, and M is a positive integer less than N.

In some examples, when it is to cancel receiving the downlink transmission on the first transmission resources, the apparatus 700 further includes: a second delaying module, configured to delay receiving M repetitions corresponding to the first transmission resources; and a second decoding module, configured to perform a data decoding based on the N repetitions.

The downlink transmission scenarios targeted by these examples include, but are not limited to, the following scenarios.

In one scenario, during PDSCH scheduled by a network is transmitted repeatedly, the transmission resources of at least one repetition overlap with the transmission resources of the one or more SSBs.

In another scenario, at all of the PDCCH resource position candidates detected by a user device, the transmission resources of at least one repetition in the resources for the repetition configured by the base station overlap with the transmission resources of the one or more SSBs.

In the above cases where the resources are overlapped, two schemes are provided.

In the first scheme, when the collision occurs, it is to cancel the downlink transmission. That is, it is to skip a certain repetition with the collision when there is the overlap between the resource of the repetition and the resources of the one or more SSBs.

For example, for the downlink transmission of the PDSCH, the base station may not send this repetition of the PDSCH, but give priority to transmitting the one or more SSBs on the resource. When being received by a user, it is to skip receiving and processing this repetition.

As another example, for the PDCCH, when a certain resource position candidate has been selected by the base station to carry the information of the PDCCH but on the resource position candidate the transmission resource of a certain repetition of the PDCCH overlaps with the transmission resources of the one or more SSBs, the base station may give priority to transmitting the one or more SSBs, instead of transmitting this repetition on the position where there is a collision. At the user side, for the PDCCH resource position candidate to be received, the user is to skip receiving the repetition with the collision.

When the number of the repetitions configured by the network is N and there are M repetitions that collide with the one or more SSBs, there are two processing approaches.

In the first approach, it is to discard the skipped repetitions. That is, the actual number of times transmitted is N–M.

In the second approach, the skipped repetitions are delayed to be transmitted on the subsequent time domain where there is no collision. Thus, the actual number of times transmitted at this time is still N, only with the transmission duration being lengthened.

The second scheme is the puncturing way, in which the number of the repetitions that overlap with the resources of the one or more SSBs at the resource position candidates of PDSCH/PDCCH is remained, and only the transmission corresponding to the overlapped part of the resources is canceled.

In particular, for example, when the base station performs a rate matching, it still performs the rate matching according to the resources allocated to the user, that is, the resources occupied by the one or more SSBs will not be subtracted from the total allocated resources. When a collision occurs between the resources of some repetitions and the resources of the one or more SSBs, the base station transmits the SSB resources in a limited manner and discards the PDCCH/PDSCH information mapped to these overlapped resources.

The user may receive this repetition when the user device is convenient to receive. However, it has to take additional processing at the user end for the data carried by the part of the resources that is occupied by the one or more SSBs. For example, it may set all the powers of the data symbols carried by that part to "0", or replace all the data carried by that part with "0" or "1", and correct it through a channel decoding.

In particular, it may determine to adopt the first scheme or the second scheme for the transmission based on an overlapped status of the resources. For example, a condition is predefined. When the condition is met, it is to adopt the second scheme to perform the transmission in the puncturing way, i.e., to remain the repetition with a collision. It is to discard a certain repetition with a resource overlap when the condition is not met.

This predefined condition, for example, may be that a number of REs with the resource overlap is less than a certain value, or a proportion of the amount of the overlapped resources in the amount of the total resources of PDSCH/PDCCH resource position candidates is less than a certain ratio.

The examples of the present disclosure provide a communication device, including one or more processors, a transceiver, a memory, and an executable program stored on the memory and capable of being run by the one or more processors. The one or more processors, when executing the executable program, perform the downlink transmission sending method applicable to the base station or the downlink transmission receiving method applicable to the terminal provided by any one of the foregoing technical solutions.

The communication device may be the aforementioned base station or terminal.

The one or more processors may include various types of storage media. The storage medium is a non-transitory computer storage medium that is capable of keeping storing information thereon after the communication device is powered off. The communication device includes a base station or a user device.

The one or more processors may be connected to the memory through a bus or the like, and are used to read an executable program stored on the memory, for example, at least one of the methods illustrated in FIGS. 2 to 5. The examples of the present disclosure provide a computer storage medium that stores an executable program. The executable program, after being executed by one or more processors, can implement the downlink transmission sending method applicable to the base station or the downlink transmission receiving method applicable to the terminal provided by any one of the foregoing technical solutions.

An example of the present disclosure provides a downlink transmission sending method, which includes: in response to there is an overlap between first transmission resources of a repetition and second transmission resources of one or more SSBs, making the overlapped resource units used to transmit the one or more SSBs.

The transmission resources of one repetition may include one or more REs.

In some examples, in a case where besides the overlapped resource units, there are remaining resources that do not overlap with the transmission resources of the one or more SSBs in the transmission resources of the one repetition which overlap with the transmission resources of the one or more SSBs, the remaining resources may be discarded. In this way, it means to cancel the downlink transmission on the resources of the repetition between which and the one or more SSBs the resource overlap occurs. When the remaining resources continue to be used for the downlink transmission, it is equivalent to the aforementioned transmission in the puncturing way.

In some examples, the method further includes: determining an overlapped status of the overlap in response to determining that there is the overlap between the first transmission resources of the repetition and the second transmission resources of the one or more SSBs.

In some examples, making the overlapped resource units used to transmit the one or more SSBs includes: in response to determining that a number of the overlapped resource units between the first transmission resources of the repetition and the second transmission resources of the one or more SSBs is greater than or equal to a first threshold, making the overlapped resource units used to transmit the one or more SSBs.

In some examples, it is to make the overlapped resource units used to transmit both the one or more SSBs and the repetition in the puncturing way, which includes: in response to determining that the number of the overlapped resource units between the first transmission resources of the repetition and the second transmission resources of the one or more SSBs is less than or equal to a first threshold, making the overlapped resource units used to transmit both the one or more SSBs and the repetition in the puncturing way.

In some examples, making the overlapped resource units used to transmit the one or more SSBs includes: in response to determining that a proportion of the overlapped resource units between the first transmission resources of the repetition and the second transmission resources of the one or more SSBs in the first transmission resources is greater than or equal to a second threshold, making the overlapped resource units used to transmit the one or more SSBs.

In some examples, it is to make the overlapped resource units used to transmit both the one or more SSBs and the repetition in the puncturing way, which includes: in response to determining that a proportion of the overlapped resource units between the first transmission resources of the repetition and the second transmission resources of the one or more SSBs in the first transmission resources is less than or equal to a second threshold, making the overlapped resource units used to transmit both the one or more SSBs and the repetition in the puncturing way.

In some examples, making the overlapped resource units used to transmit the one or more SSBs includes: in response to determining that a proportion of the overlapped resource units between the first transmission resources of the repetition and the second transmission resources of the one or more SSBs in the second transmission resources is less than the second threshold or is less than or equal to the second threshold, making the overlapped resource units used to transmit the one or more SSBs.

In some examples, it is to make the overlapped resource units used to transmit both the one or more SSBs and the repetition in the puncturing way, which includes: in response to determining that a proportion of the overlapped resource units between the first transmission resources of the repetition and the second transmission resources of the one or more SSBs in the second transmission resources is less than or equal to the second threshold, making the overlapped resource units used to transmit both the one or more SSBs and the repetition in the puncturing way.

In some examples, the method further includes: performing a rate matching based on the determined transmission resources of the repetition.

In some examples, making the overlapped resource units used to transmit both the one or more SSBs and the repetition in the puncturing way includes: making a part of the resource units, the overlapped resource units, used to transmit at least a part of the one or more SSBs, and making the other part of the resource units, the non-overlapped resource units, used to transmit at least a part of the downlink transmission.

Figure 10:
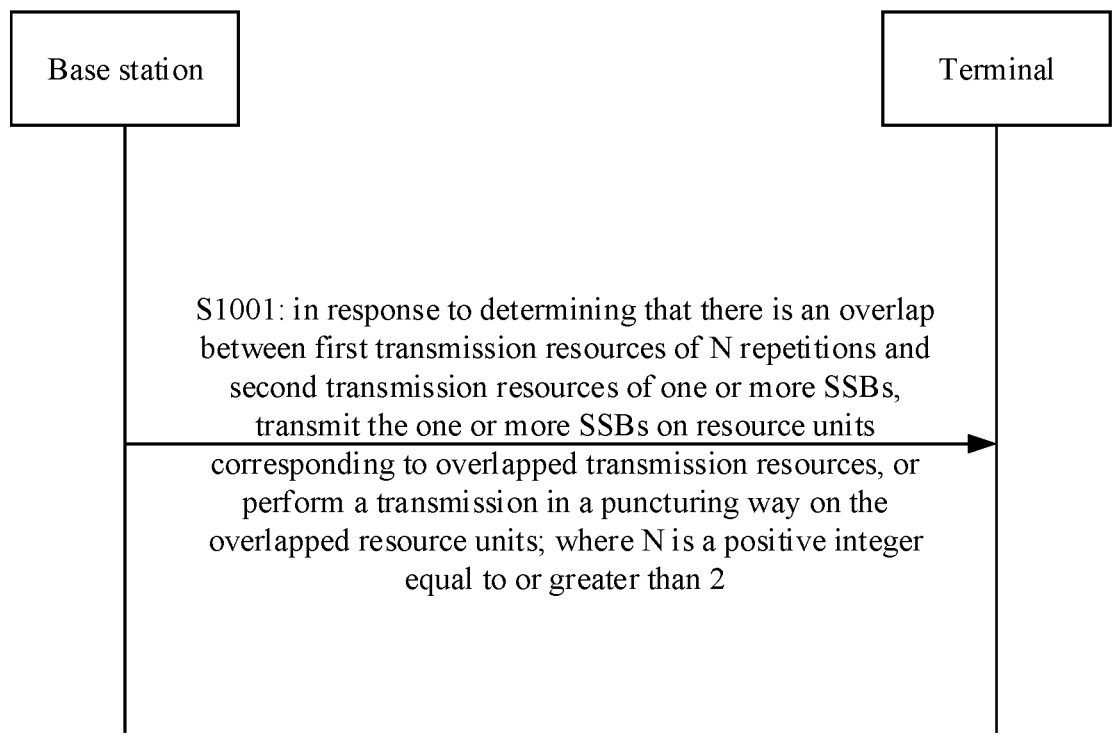
FIG. 10 illustrates a schematic flowchart of a downlink transmission sending method according to an example.

As illustrated in FIG. 10, is an example of the present disclosure that provides a downlink transmission sending method. The method is applicable to a base station and includes the following step.

S1001: in response to determining that there is an overlap between first transmission resources of N repetitions and second transmission resources of one or more SSBs, the one or more SSBs are transmitted on resource units corresponding to overlapped transmission resources. N is a positive integer equal to or greater than 2. The N repetitions belong to one downlink transmission.

In the example of the present disclosure, in response to determining that the one or more SSBs are transmitted on the resource units corresponding to the overlapped transmission resources, the repetitions corresponding to these transmission units are canceled. To cancel the repetitions corresponding to the transmission units may include that it is no longer to transmit the repetitions corresponding to the transmission units, or that it is to transmit a part of repetitions by utilizing available transmission resources, i.e., on the available transmission resources.

In the example of the present disclosure, during encoding the repetitions, it is to encode the repetitions and to cancel, in response to determining that the overlap occurs, the encoding corresponding to the overlapped transmission units. In another example of the present disclosure, during encoding the repetitions, it is to ignore the repetitions corresponding to the overlapped transmission units and to encode the other repetitions.

The downlink transmission sending method in these examples may be applied to 4G, 5G or any subsequent generation communication system. Taking a 5G system as an example, every NR cell periodically sends one or more synchronization signals in a downlink direction. The synchronization signal carried by an SSB includes one or more of a primary synchronization signal, a secondary synchronization signal and a physical broadcast channel. One specific SSB occupies 4 Orthogonal Frequency Division Multiplexing (OFDM) symbols in time domain and 240 subcarriers in frequency domain.

A key difference between the SSB and an LTE signal is that a network (for example, a base station) may transmit the SSB in a beam scanning manner, that is, transmit different SSBs on different beams in a form of time division multiplexing. The SSB set in the beam scanning manner is called a synchronization signal burst set (SSB burst). For a specific terminal, only one SSB can be seen by it and the other SSBs are informed to it through high-level signaling.

In some scenarios, the transmission resources of the one or more SSBs may overlap with the resources of a downlink transmission. The downlink transmission may include a downlink control channel transmission and/or a downlink data channel transmission. For example, the downlink transmission includes a physical downlink control channel (PDCCH) transmission and/or a physical downlink shared channel (PDSCH) transmission.

In some scenarios, the downlink transmission for a device, such as an MTC terminal, an NB-IoT terminal or an NR-lite terminal, may be transmitted repeatedly for multiple times. In some examples, a typical NR-lite terminal includes, but is not limited to, a wearable device, an industrial sensor, a monitoring device, and/or a medical device.

For example, one piece of data is transmitted in N repetitions. Thus, the transmission resources occupied by any one repetition of the N repetitions may overlap with the transmission resources of the one or more SSBs. An overlapped resource means that one transmission resource is occupied by both one repetition and the one or more SSBs. Of course, it is possible that multiple repetitions of the N repetitions separately overlap with the one or more SSBs. In this case, the solutions provided by the examples of the present disclosure are performed on any one overlapped repetition or each overlapped repetition, which is not limited by the examples of the present disclosure.

In the examples of the present disclosure, in response to determining that there is an overlap between the first transmission resources corresponding to one repetition of the N repetitions and the second transmission resources corresponding to the one or more SSBs over at least a part of resource units, the one or more SSBs are transmitted on the overlapped resource units, or the overlapped resource units are punctured for the transmission.

In the example of the present disclosure, to transmit the one or more SSBs on the overlapped resource units means to transmit the one or more SSBs, instead of the repetition, on the overlapped resource units. That is, in response to determining that there is the overlap between the first transmission resources and the second transmission resources, the overlapped resource units are only used to transmit the one or more SSBs, rather than transmit the downlink transmission. In some embodiments of the present disclosure, the transmission in the punctured way refers to that a part of the resource units, i.e., the overlapped resource units, is used to transmit at least a part of the one or more SSBs, and the other part of the resource units, i.e., the non-overlapped resource units, is used to transmit at least a part of the repetition.

In the examples of the present disclosure, when the transmission resources of at least one repetition of the repetitions overlap with the transmission resources corresponding to the transmission of the synchronization signal, the overlapped resource units are used to transmit the one or more SSBs. In this way, it is solved how to perform the transmission when the transmission resources of one or more SSBs overlap with the transmission resources of at least one repetition in a case where there are multiple repetitions of the downlink transmission, and thereby, it achieves a conflict-free and effective transmission between the synchronization signal and the wireless signal in such scenarios where the multiple repetitions occur.

In some examples, the method further includes: in response to there is the overlap between the first transmission resources and the second transmission resources, determining to transmit only the one or more SSBs, and to discard the downlink transmission in N repetitions on the non-overlapped resources or to continue to perform the downlink transmission in N repetitions on the non-overlapped resources.

In the examples of the present disclosure, the base station determines whether to only transmit the one or more SSBs or to transmit the one or more SSBs in the puncturing way on the overlapped resource units based on an overlapped status between the first transmission resources of the repetition and the second transmission resources of the one or more SSBs.

For example, in response to determining that the overlapped status between the first transmission resources of the repetitions and the second transmission resources of the one or more SSBs is large, through entirely canceling the sending on the first transmission resources, it can lower the data transmission complexity of both the base station and the terminal.

As another example, when the overlapped degree between the first transmission resources and the second transmission resources of the one or more SSBs is relatively small, through canceling a whole repetition, it may lead to more transmission resources to be wasted.

For example, the overlapped status is determined when the first transmission resources of the repetition overlap with the second transmission resources of the one or more SSBs. In an example of the present disclosure, the overlapped status may be represented by a number of overlapped REs, or by a proportion of the number of the overlapped resources in a total number of the resources of one repetition. When the number of the overlapped REs between the first resource units and the second resource units is less than a first threshold, it means that there are few overlapped resource units.

Alternatively, when the proportion of the number of the overlapped resources between the first transmission resources and the second transmission resources in the first transmission resources is less than a second threshold, it means few overlapped resource units.

In the example of the present disclosure, the overlapped resources between the first transmission resources and the second transmission resources are counted in a unit of RE. When the number of the overlapped REs is less than a first threshold, it may be regarded as a little overlap degree, and thus, it is preferred to perform the sending in the puncturing way to reduce the resource waste. The first threshold value is a positive integer, which may be taken from an experimental value or an empirical value.

In some other examples, however, when both the first transmission resources and the second transmission resources have a relatively small size or a relatively large size on their own, it may still lead to the unnecessary resource waste and/or an encoding and decoding complexity if the overlap degree is determined based on the comparison between the number of the overlapped REs and the first threshold. Thus, it may be determined based on a proportion of the number of the overlapped resources in the first transmission resources. The second threshold may be a ratio, for example, a percentage. The specific value of the second threshold may be 0.2, 0.3, 0.4, or 0.5, etc.

Therefore, in one or more examples of the present disclosure, the scheme that the sending is canceled or the scheme that the sending is performed in the puncturing way may be selected based on the overlapped status so as to be suited to the current overlapped status, thereby avoiding the unnecessary resource waste as much as possible and inhibiting increase of the unnecessary encoding and decoding complexity.

In some examples, when it is to cancel sending the downlink transmission on the first transmission resources, the method further includes: in response to determining that the M repetitions of the N repetitions overlap with the transmission of the one or more SSBs, discarding the M repetitions, so that the downlink transmission has a total of N−M repetitions; or in response to determining that the M repetitions of the N repetitions overlap with the transmission of the one or more SSBs, delaying sending the M repetitions, so that the downlink transmission has a total of N repetitions; or in response to determining that the M repetitions of the N repetitions overlap with the transmission of the one or more SSBs, discarding m repetitions and delaying sending M−m repetitions, so that the downlink transmission has a total of N−M+m repetitions.

M is a positive integer less than N, and m is a positive integer less than M.

As a result of canceling the sending on the first transmission resources, the number of the repetitions from the base station on the original configured resources may be less than the configured N times. For example, by discarding all of the overlapped repetitions, the number of repetitions whose transmission is actually completed is N−M. As another example, by discarding a part of the repetition, the number of repetitions whose transmission is actually completed is N−M+m.

In the examples of the present disclosure, there are two approaches to deal with this situation.

One approach is to discard the M repetitions or the m repetitions, and maintain N−M repetitions or the N−M+m repetitions.

The other approach is to delay the transmission of the M repetitions canceled on the first transmission resources to ensure the N repetitions. For example, the uncompleted M repetitions are immediately transmitted after the N−M transmissions are completed. As another example, they are delayed to be transmitted in a next transmission period. When the transmission is periodic, the M repetitions canceled in this period are to be automatically delayed and transmitted on the transmission resources configured in the next period. The transmission delay is a concept in comparison with the original planned moment of the canceled M repetitions.

In an example, which transmission approach, discarding the M repetitions or delaying the M repetitions, may be determined based on a current channel condition. For example, in a case where the current channel condition is good, e.g., in a case where one or more reference signals of various types are transmitted and then it is found that the received strength(s) of the one or more reference signals are greater than or equal to a strength threshold, the current channel condition may be considered to be good, and the M repetitions may be discarded directly, instead of being delayed. If it is found that the current channel condition is bad, for example, the received strength(s) of the one or more reference signals are less than the aforementioned strength threshold, the M repetitions may be delayed.

In this way, a receiving gain at the terminal can still be ensured when the channel condition is good even if one or more repetitions are appropriately reduced, and the receiving gain at the terminal can also be ensured when the channel condition is bad through delaying the M repetitions.

In another example, which transmission approach, discarding the M repetitions or delaying the M repetitions, may be determined based on the value of M. For example, if M is greater than or equal to a discarding threshold, the terminal may not obtain an enough time-domain gain to successfully decode the data sent by the base station without performing the transmission delay. Therefore, the transmission delay approach is adopted so that the final actual number of the repetitions is still M. If the current M is less than the discarding threshold, the number of the repetitions actually received by the terminal, without performing the transmission delay, is still relatively large, and the time-domain gain is enough to successfully decode the data sent by the base station.

In some examples, the discarding threshold may be determined based on N. The discarding threshold may be a preset percentage of N.

In some other examples, the value of M and the channel condition may be combined to jointly determine which approach is adopted, discarding M repetitions so that the number of the actual repetitions is N−M or delaying M repetitions so that the number of the actual repetitions is N.

In one or more examples of the present disclosure, the sending in the puncturing way includes sending the downlink transmission on the first transmission resources except the overlapped resources. Through the sending in the puncturing way, it can reduce the transmission resource waste as much as possible.

In some examples, as illustrated in FIG. 3, the method further includes the following step.

S100: a rate matching of sending the downlink transmission is performed based on an amount of the first transmission resources in response to determining that the transmission is performed by puncturing the overlapped resource units.

In particular, that the rate matching of sending the downlink transmission is performed based on the amount of the first transmission resources, means that when the rate matching is performed, the resources participated in the rate matching include the part that overlaps with the transmission resources of the one or more SSBs.

Therefore, when the base station adopts the scheme of transmission in the puncturing way to transmit the repetition overlapped with the resources of the one or more SSBs, the rate matching of the downlink transmission is still performed based on the amount of the first transmission resources before being punctured, so as to lower the complexity of the rate matching. Thus, it is avoids both high encoding and modulating complexity and high decoding and demodulating complexity at the terminal which are caused by different types of rate matching for the multiple repetitions of the same data.

In some examples, the downlink transmission includes a physical downlink shared channel (PDSCH) transmission and/or a physical downlink control channel (PDCCH) transmission.

For example, for the PDSCH, the base station may not send a certain repetition of the PDSCH transmission, but give priority to transmitting the one or more SSBs on its resource.

For the PDCCH, when a certain resource position candidate has been selected by the base station to carry the information of the PDCCH but there is an overlap on the resource position candidate between the transmission resources of a certain repetition of the PDCCH and the transmission resource of the one or more SSBs, the base station may give priority to transmitting the one or more SSBs, instead of transmitting the repetition on the position where there is a collision (i.e., a resource overlap).

Of course, during a specific implementation, it is not limited to the examples of the downlink transmission in the above description.

Figure 8:
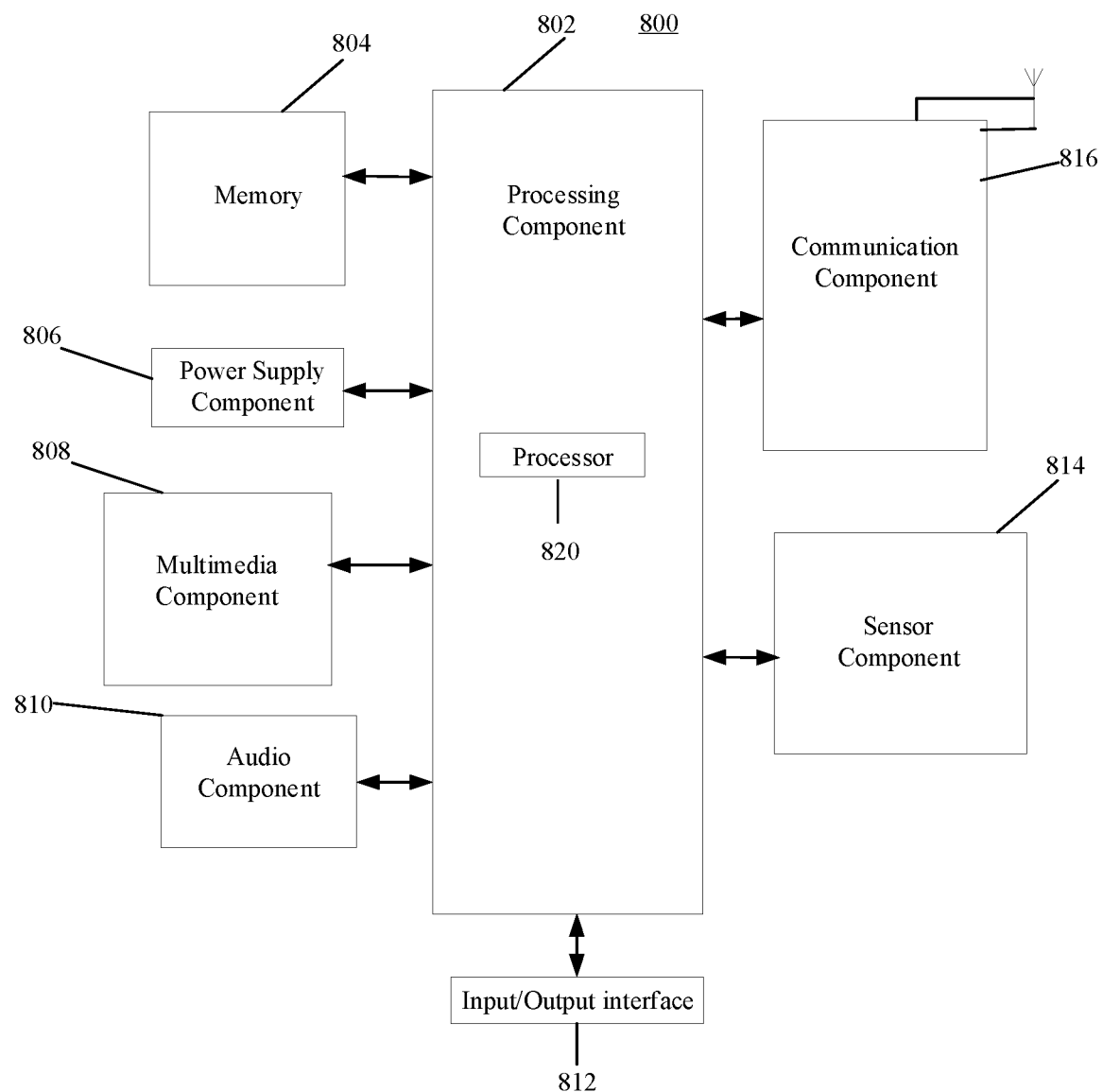
FIG. 8 is a schematic structural diagram of a terminal according to an example.

FIG. 8 illustrates a block diagram of a terminal (UE) 800 according to an example. For example, the terminal 800 may be a mobile phone, a computer, a digital broadcasting user device, a messaging device, a game console, a tablet device, a medical device, a fitness device, a personal digital assistant, and the like.

Referring to FIG. 8, the terminal 800 may include one or more of the following components: a processing component 802, a memory 804, a power supply component 806, a multimedia component 808, an audio component 810, an input/output (I/O) interface 812, a sensor component 814, and a communication component 816.

The processing component 802 generally controls the overall operations of the terminal 800, such as operations associated with display, phone calls, data communications, camera operations, and recording operations. The processing element 802 may include one or more processors 820 to execute instructions to complete all or a part of the steps of the above methods. In addition, the processing component 802 may include one or more modules which facilitate the interaction between the processing component 802 and other components. For example, the processing component 802 may include a multimedia module to facilitate the interaction between the multimedia component 808 and the processing component 802.

The memory 804 is configured to store various types of data to support the operations of the terminal 800. Examples of such data include instructions for any application or method operated on the terminal 800, contact data, phonebook data, messages, pictures, videos, and the like. The memory 804 may be implemented by any type of volatile or non-volatile storage device or a combination thereof, such as a static random access memory (SRAM), an electrically erasable programmable read-only memory (EEPROM), an erasable and programmable read-only memory (EPROM), a programmable read-only memory (PROM), a read-only memory (ROM), a magnetic memory, a flash memory, a magnetic disk or an optical disk.

The power supply component 806 provides power for various components of the terminal 800. The power supply component 806 may include a power management system, one or more power supplies, and other components associated with generating, managing, and distributing power for the terminal 800.

The multimedia component 808 includes a screen providing an output interface between the terminal 800 and a user. In some examples, the screen may include a liquid crystal display (LCD) and a touch panel (TP). If the screen includes the TP, the screen may be implemented as a touch screen to receive input signals from the user. The TP may include one or more touch sensors to sense touches, swipes, and gestures on the TP. The touch sensors may not only sense a boundary of a touch or swipe, but also sense a lasting time and a pressure associated with the touch or swipe. In some examples, the multimedia component 808 includes a front camera and/or a rear camera. The front camera and/or rear camera may receive external multimedia data when the terminal 800 is in an operating mode, such as a photographing mode or a video mode. Each front camera and rear camera may be a fixed optical lens system or have focal length and optical zooming capability.

The audio component 810 is configured to output and/or input an audio signal. For example, the audio component 810 includes a microphone (MIC) that is configured to receive an external audio signal when the terminal 800 is in an operating mode, such as a call mode, a recording mode, and a voice recognition mode. The received audio signal may be further stored in memory 804 or transmitted via communication component 816. In some examples, the audio component 810 also includes a speaker for outputting an audio signal.

The I/O interface 812 provides an interface between the processing component 802 and a peripheral interface module. The above peripheral interface module may be a keyboard, a click wheel, buttons, or the like. These buttons may include but not be limited to a home button, a volume button, a start button and a lock button.

The sensor component 814 includes one or more sensors to provide the terminal 800 with status assessments in various aspects. For example, the sensor component 814 may detect an open/closed state of the device 800 and a relative positioning of components such as the display and keypad of the terminal 800, and the sensor component 814 may also detect a change in position of the terminal 800 or a component of the terminal 800, the presence or absence of user contact with the terminal 800, orientation or acceleration/deceleration of the terminal 800, and temperature change of the terminal 800. The sensor component 814 may include a proximity sensor configured to detect the presence of a nearby object without any physical contact. The sensor component 814 may further include an optical sensor, such as a Complementary Metal-Oxide-Semiconductor (CMOS) or Charged Coupled Device (CCD) image sensor, for being applied in imaging applications. In some examples, the sensor component 814 may also include an acceleration sensor, a gyro sensor, a magnetic sensor, a pressure sensor, or a temperature sensor.

The communication component 816 is configured to facilitate wired or wireless communication between the terminal 800 and other devices. The terminal 800 may access a wireless network based on a communication standard, such as WiFi, 2G, 3G or a combination thereof. In one example, the communication component 816 receives broadcast signals or broadcast related information from an external broadcast management system via a broadcast channel. In an example, the communication component 816 also includes a near field communication (NFC) module to facilitate short-range communication. For example, the NFC module may be implemented based on a radio frequency identification (RFID) technology, an infrared data association (IrDA) technology, an ultra-wideband (UWB) technology, a Bluetooth® (BT) technology and other technologies.

In one or more examples, the terminal 800 may be implemented by one or more application specific integrated circuits (ASIC), digital signal processors (DSP), digital signal processing equipment (DSPD), programmable logic devices (PLD), field programmable gate array (FPGA), controller, microcontroller, microprocessor, or other electronics to perform the foregoing methods.

In one or more examples, there is also provided a non-transitory computer-readable storage medium including instructions, such as the memory 804 including instructions.

These instructions may be executed by the one or more processors 820 of the terminal 800 to complete the foregoing methods. For example, the non-transitory computer-readable storage medium may be a read-only memory (ROM), a random access memory (RAM), a CD-ROM, a magnetic tape, a floppy disk, an optical data storage device, and the like.

Figure 9:
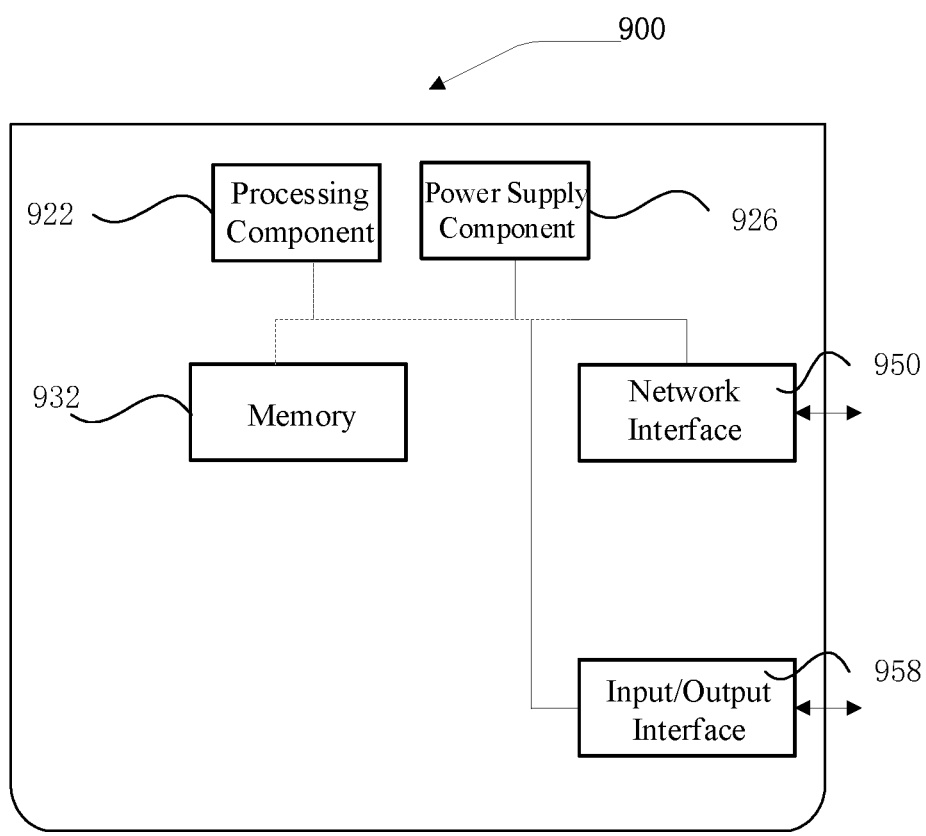
FIG. 9 is a schematic structural diagram of a base station according to an example.

As illustrated in FIG. 9, an example of the present disclosure illustrates a structure of a base station. For example, the base station 900 may be provided as a network-side device. Referring to FIG. 9, the base station 900 includes a processing component 922 which further includes one or more processors, and a memory resource represented by a memory 932 which is used to store instructions that may be executed by the processing component 922, such as application programs. The application programs stored in the memory 932 may include one or more modules, each of which corresponds to a set of instructions. In addition, the processing component 922 is configured to execute instructions to perform any one of the aforementioned methods applicable to the base station, for example, the methods illustrated in FIG. 2-FIG. 3.

The base station 900 may also include a power supply component 926 configured to perform power management for the base station 900, a wired or wireless network interface 950 configured to connect the base station 900 to a network, and an input/output (I/O) interface 958. The base station 900 may operate based on an operating system stored in the memory 932, such as Windows Server™, Mac OS X™, Unix™, Linux™, FreeBSD™ or the like.

According to the technical solutions provided by the embodiments of the present disclosure, when one or more of N repetitions are separately in resource conflict with a synchronization signal transmission, a base station cancels sending a downlink transmission corresponding to the one or more repetitions, or sending the downlink transmission in a puncturing way. In this way, it is solved how the base station handles the conflict between wireless signals when there are multiple repetitions of the downlink transmission and the transmission resources of one or more SSBs overlap with the transmission resources of at least one repetition, and thereby, it achieves a conflict-free and effective transmission between the one or more synchronization signals and the wireless signals in such scenarios where the multiple repetitions occur. And, the terminal cancels receiving the downlink transmission corresponding to the one or more repetitions or receives the downlink transmission sent in the puncturing way, and thereby, it reduces unnecessary receptions at the terminal and reduces a power consumption of the terminal.

Other implementations of the present disclosure will be readily apparent to those skilled in the art after implementing the disclosure by referring to the specification. The present disclosure is intended to cover any variations, uses, or adaptations of the present disclosure that are in accordance with the general principles thereof and include common general knowledge or conventional technical means in the art that are not disclosed in the present disclosure. The description and the examples are only illustrative, and the true scope and spirit of the present disclosure are set forth in the appended claims.

It should be understood that the present disclosure is not limited to the above-described accurate structures illustrated in the drawings, and various modifications and changes can be made to the present disclosure without departing from the scope thereof. The scope of the present disclosure is to be limited only by the appended claims.

The invention claimed is:

1. A downlink transmission sending method, applicable to a base station, comprising:
for a downlink transmission in N repetitions, in response to determining that a repetition overlaps with second transmission resources of one or more synchronization signal blocks,
canceling sending the downlink transmission on first transmission resources, delaying sending the M repetitions corresponding to the first transmission resources, so that the downlink transmission comprises a total of N repetitions; wherein M is a positive integer less than N; or
sending the downlink transmission by puncturing the first transmission resources;
wherein the first transmission resources are for the repetition and overlap with the second transmission resources of the one or more synchronization signal blocks over at least one resource element (RE);
wherein sending the downlink transmission by puncturing the first transmission resources comprises canceling sending a part of the downlink transmission which is mapped onto one or more overlapped resources between the first transmission resources and the second transmission resources; and
wherein N is a positive integer equal to or greater than 2.

2. The method according to claim 1, further comprising at least one of:
determining, in response to determining that an overlapped status between the first transmission resources and the second transmission resources of the one or more synchronization signal blocks does not meet a preset condition, to cancel sending the downlink transmission on the first transmission resources; and
determining, in response to determining that the overlapped status between the first transmission resources and the second transmission resources of the one or more synchronization signal blocks meets the preset condition, to send the downlink transmission by puncturing the first transmission resources.

3. The method according to claim 2, wherein the overlapped status between the first transmission resources and the second transmission resources of the one or more synchronization signal blocks meets the preset condition in at least one case of:
a number of REs of one or more overlapped resources between the first transmission resources and the second transmission resources being less than a first threshold; or
a proportion of the one or more overlapped resources between the first transmission resources and the second transmission resources in the first transmission resources being less than a second threshold.

4. The method according to claim 1, further comprising:
performing, based on an amount of the first transmission resources, a rate matching of sending the downlink transmission in response to sending the downlink transmission by puncturing the first transmission resources.

5. The method according to claim 1, wherein the downlink transmission comprises at least one of a physical downlink shared channel (PDSCH) transmission or a physical downlink control channel (PDCCH) transmission.

6. A downlink transmission receiving method, applicable to a terminal, comprising:
for a downlink transmission in N repetitions, in response to determining that a repetition overlaps with second transmission resources of one or more synchronization signal blocks, canceling receiving the downlink transmission on first transmission resources, delaying receiving M repetitions corresponding to the first transmission resources; and performing a data decoding based on the N repetitions; or receiving the downlink transmission by puncturing the first transmission resources;

wherein the first transmission resources are for the repetition and overlap with the second transmission resources of the one or more synchronization signal blocks over at least one resource element (RE);

wherein receiving the downlink transmission by puncturing the first transmission resources comprises canceling receiving a part of the downlink transmission which is mapped onto one or more overlapped resources between the first transmission resources and the second transmission resources; and wherein N is a positive integer equal to or greater than 2.

7. The method according to claim 6, further comprising at least one of:

determining, in response to determining that an overlapped status between the first transmission resources and the second transmission resources of the one or more synchronization signal blocks does not meet a preset condition, to cancel receiving the downlink transmission on the first transmission resources; and determining, in response to determining that the overlapped status between the first transmission resources and the second transmission resources of the one or more synchronization signal blocks meets the preset condition, to receive the downlink transmission by puncturing the first transmission resources.

8. The method according to claim 7, wherein the overlapped status between the first transmission resources and the second transmission resources of the one or more synchronization signal blocks meets the preset condition in at least one case of:

a number of REs of the one or more overlapped resources between the first transmission resources and the second transmission resources being less than a first threshold; or a proportion of the one or more overlapped resources between the first transmission resources and the second transmission resources in the first transmission resources being less than a second threshold.

9. The method according to claim 6, further comprising:

complementing, in response to decoding the downlink transmission received by puncturing the first transmission resources the punctured transmission resources of the first transmission resources using preset data.

10. The method according to claim 9, wherein complementing, in response to decoding the downlink transmission received by puncturing the first transmission resources, the punctured transmission resources of the first transmission resources using the preset data comprises:

setting a power for receiving punctured transmission resources of the first transmission resources to a preset value in response to decoding the downlink transmission received by puncturing the first transmission resources; or taking a preset sequence as data symbols carried by the punctured transmission resources of the first transmission resources in response to decoding the downlink transmission received by puncturing the first transmission resources; or taking a predetermined value as data bits carried by the punctured transmission resources of the first transmission resources in response to decoding the downlink transmission received by puncturing the first transmission resources.

11. A communication device, comprising: one or more processors, a transceiver, a memory, and an executable program stored on the memory and capable of being run by the one or more processors, wherein the one or more processors, when executing the executable program, are configured to perform the downlink transmission receiving method according to claim 6.

12. A communication device, comprising: one or more processors, a transceiver, a memory, and an executable program stored on the memory and capable of being run by the one or more processors, wherein the one or more processors, when executing the executable program, are configured to perform the following actions:

for a downlink transmission in N repetitions, in response to determining that a repetition overlaps with second transmission resources of one or more synchronization signal blocks, canceling sending the downlink transmission on first transmission resources, delaying sending the M repetitions corresponding to the first transmission resources, so that the downlink transmission comprises a total of N repetitions; wherein M is a positive integer less than N; or sending the downlink transmission by puncturing the first transmission resources;

wherein the first transmission resources are for the repetition and overlap with the second transmission resources of the one or more synchronization signal blocks over at least one resource element (RE);

wherein sending the downlink transmission by puncturing the first transmission resources comprises canceling sending a part of the downlink transmission which is mapped onto one or more overlapped resources between the first transmission resources and the second transmission resources; and wherein N is a positive integer equal to or greater than 2.

* * * * *

UNITED STATES PATENT AND TRADEMARK OFFICE
CERTIFICATE OF CORRECTION

PATENT NO. : 12,407,441 B2  
APPLICATION NO. : 17/911082  
DATED : September 2, 2025  
INVENTOR(S) : Qin Mu Page 1 of 1

It is certified that error appears in the above-identified patent and that said Letters Patent is hereby corrected as shown below:

In the Specification  
In Column 10, Line 61, delete "5220:" and insert -- S220: --, therefor.

In the Claims  
In Column 27, Line 50, in Claim 9, delete "resources" and insert -- resources, --, therefor.

Signed and Sealed this  
Eighteenth Day of November, 2025

John A. Squires  
*Director of the United States Patent and Trademark Office*